June 21, 1932.  H. H. BAKER  1,864,176
PROCESS AND APPARATUS FOR THE MANUFACTURE OF LAMINATED GLASS
Filed April 26, 1928
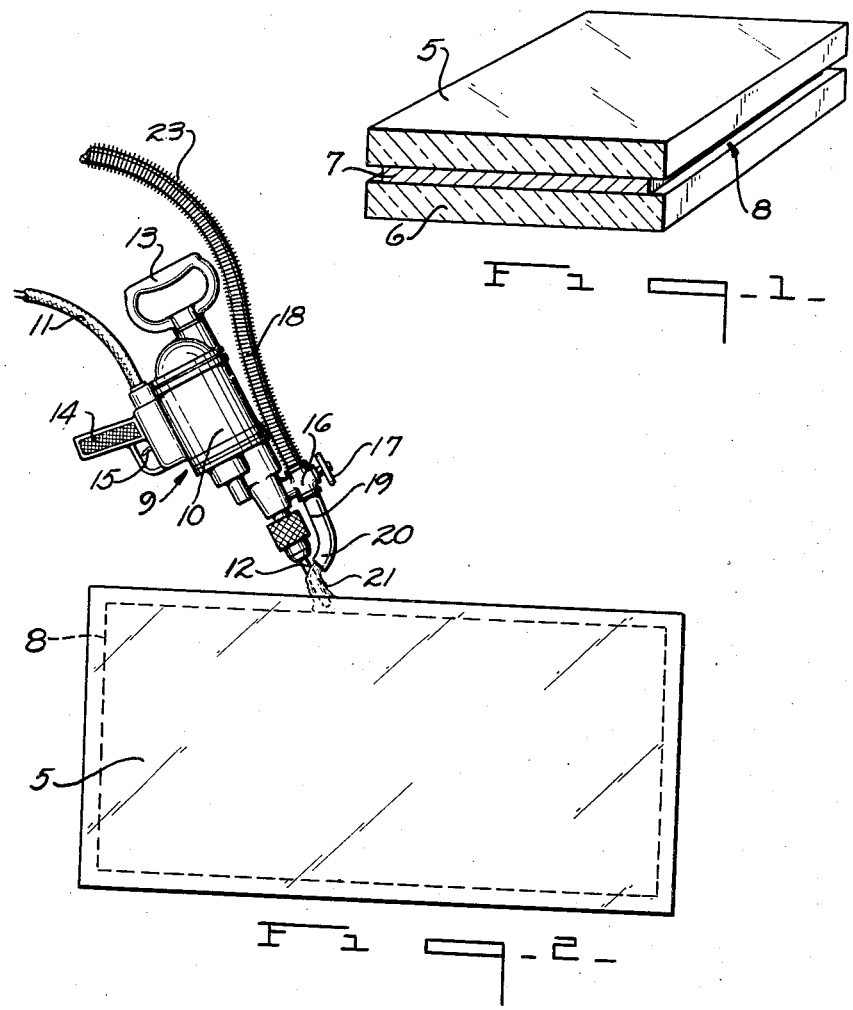
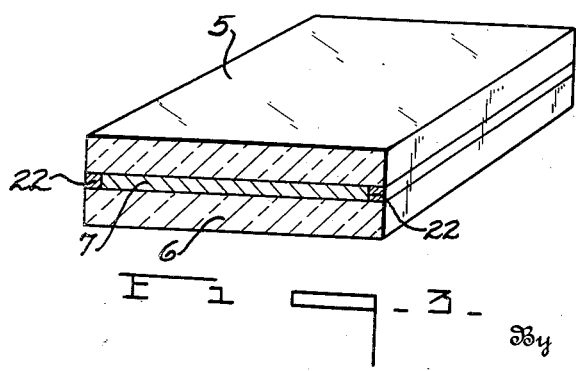
Inventor
Herbert H. Baker
By Frank Fraser
Attorney Patented June 21, 1932

1,864,176

UNITED STATES PATENT OFFICE

HERBERT H. BAKER, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR THE MANUFACTURE OF LAMINATED GLASS

Application filed April 26, 1928. Serial No. 272,904.

This invention relates broadly to the manufacture of laminated or composite glass and more particularly to an improved process and apparatus for sealing or luting the edges thereof.

In the manufacture of laminated glass, it is customary to unite two or more sheets of glass and one or more sheets or layers of non-brittle material to form a unitary structure, one sheet of non-brittle material being ordinarily interposed between and bonded to two sheets of glass. Laminated glass is desirable for the reason that, when the proper materials are used and an adequate bond obtained between the several sheets or laminations, it is practically non-shatterable. However, the practicability and commercial value of the laminated sheet is dependent largely upon the quality and permanency of the bond between the laminations. Thus, in some types of laminated glass the bond between the laminations is relatively easily affected by atmospheric conditions, etc., and the atmosphere, if permitted to act on the bond, will cause a breaking down thereof and allow a separation of the laminations. In order to protect the bond and render the same impervious to the atmosphere, the practice of sealing or luting the edges of the laminated sheet is sometimes followed. This sealing or luting may be accomplished by first providing a continuous channel or groove around the edges of the laminated sheet between the adjacent sheets of glass and then filling in this channel or groove with a suitable sealing material.

An aim of the present invention is to provide an improved process and apparatus whereby the sealing or luting of a laminated sheet of glass may be accomplished in an easy and efficient manner to the end that a seal or lute will be provided which will properly protect the bond between the several laminations and which will prevent separation thereof incident to atmospheric conditions.

Another object of the invention is to provide such a process and apparatus of the character above stated wherein the sealing material or medium used will be caused to flow in a liquid state into the edge channel or groove in the laminated sheet in a more rapid and uniform manner than heretofore.

Another object is to provide such a process and apparatus of the above character including novel means for feeding the sealing material into place and for accurately controlling the temperature thereof during such feeding.

A somewhat more specific object is the provision of an improved type of portable sealing machine or unit movable with respect to the laminated sheet and including a rotatable element adapted to be received within the channel or groove thereof to be sealed, means being provided for flowing the sealing material used upon the rotatable element in such a manner that it is caused to flow down the same and into the channel or groove as the said rotatable element is guided or run along therein.

Other objects and advantages of the invention will become more apparent during the course of the following description when taken in connection with the accompanying drawing.

In the drawing forming a part of this application and wherein like numerals are employed to designate like parts throughout the same, Fig. 1 is a perspective sectional view of a sheet of laminated glass prior to the sealing thereof.

Fig. 2 is an elevation of the improved portable sealing machine or unit shown in operative relation to a laminated sheet, and Fig. 3 is a perspective sectional view showing the laminated sheet after being sealed.

Referring now to the drawing and particularly to Fig. 1 there is shown a sheet of laminated glass including the two sheets of preferably transparent glass 5 and 6 between which is interposed a sheet or membrane 7 of non-brittle material joined or bonded to the glass sheets by any suitable solvent, adhesive or the like whereby to create a unitary structure or composite sheet. The surfaces of the glass sheets may or may not be ground and polished as desired and it is to be understood that the present invention is not limited to any particular type of laminated glass, the materials used in its structure or the process of laminating. As shown, a continuous channel or groove 8 is provided around the edges of the laminated sheet and it is into this channel or groove that the sealing or luting material is adapted to be placed. The channel or groove 8 may be formed by uniting the glass sheets with a slightly smaller sheet of non-brittle material or the sheet of non-brittle material may be initially as large as the glass sheets and then subsequently cut-back from the edges of the glass sheets to form the groove or channel.

In Fig. 2 the reference numeral 9 designates the improved portable sealing machine or unit in its entirety, said unit including a housing or casing 10 within which may be contained a suitable electric motor or the like driven from any suitable source of power through the connections 11 and in turn driving the rotatable element or pin 12 through the intermediary of suitable reduction gearing also located within the housing 10. It is not thought necessary to disclose the interior construction of the machine or unit or machine 9 since such forms no portion of the present invention, the rotatable element 12 being mounted in any desired manner and driven through any suitable system or reduction gearing. However, a portable machine or unit of the type shown is preferably utilized for the reason that it can be easily handled and moved relative to the laminated sheet which is normally maintained in a fixed position during the sealing operation. The sealing machine is shown as being provided with handles 13 and 14 to facilitate the handling thereof and the rotation of the element or pin 12 may be controlled by means of a trigger 15. Although the rotatable element 12 has been termed a pin, the outer end thereof is preferably blunt instead of being pointed.

Carried by the machine housing or casing 10 is a valve 16 controlled by means of a hand-wheel or the like 17. This valve is provided with oppositely directed, preferably aligned ports within which are secured the flexible and stationary conduits 18 and 19 respectively. The flexible conduit 18 is adapted to communicate with a supply of sealing material while the outer end of the stationary conduit 19 is slightly curved as indicated at 20 and terminates in close proximity to the rotatable element 12 so that as the sealing material 21 issues from the conduit 19, it will flow onto said rotatable element and be subsequently fed thereby into the groove or channel 8 of the laminated sheet to be sealed.

In operation, the laminated sheet is preferably disposed in a fixed vertical position with its edge to be sealed uppermost and arranged in a substantially horizontal plane as shown in Fig. 2. The operator then grasps the handles 13 and 14 of the sealing machine and inserts the lower end of the rotatable element 12 within one end of the groove or channel 8. The valve 16 is then opened so that the sealing material will flow through the conduits 18 and 19 and issue from the conduit 19 onto the rotatable element 12. As the rotatable element is then run or guided along within the groove 8, the sealing material will flow down around the same and be fed thereby into the groove 8 filling up all of the space therein and forming an effective seal. With the arrangement shown, the sealing material can be fed into place in a rapid and uniform manner. After one edge of the sheet has been sealed, the remaining edges are treated in the same manner. The thickness of the sheet of non-brittle material 7 together with the width of the groove or channel 8 as shown in the drawing is of course greatly exaggerated and has been shown in this manner simply for the purposes of illustration.

Since certain kinds of sealing materials cool quite rapidly and it is therefore desirable that means be provided for heating the same so as to assure a ready flow thereof and prevent it from cooling and become hardened within and thereby clogging up the conduits 18 and 19. This may be accomplished, as shown, by encircling the flexible conduit 18 with an electric resistance wire or element 23 and when this wire or element is heated-up in the usual manner, it will serve to maintain the sealing material within the conduit at the desired temperature.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sealing apparatus of the character described, a portable sealing unit movable with respect to the work to be sealed and including a rotatable element adapted to feed the sealing material into place, and a supply conduit having one end terminating in proximity to the rotatable element so that the sealing material issuing from said conduit will flow onto said rotatable element.

2. In sealing apparatus of the character described, a portable sealing unit movable with respect to the work to be sealed and including a rotatable element adapted to feed the sealing material into place, a supply conduit having one end terminating in proximity to the rotatable element so that the sealing material issuing from said conduit will flow onto said rotatable element, and means for heating said conduit to control the temperature of the sealing material therein.

3. The process of sealing laminated glass, which consists in flowing a sealing liquid to the sheet to be sealed, and in maintaining the sealing liquid in circulation during the feeding thereof into place.

4. The process of sealing laminated glass, which consists in inserting a rotatable element within the place to be sealed, and in causing the sealing material to flow down said rotatable element into place.

Signed at Toledo, in the county of Lucas and state of Ohio, this 21st day of April, 1928.

HERBERT H. BAKER.